(12) United States Patent
Ashby

(10) Patent No.: US 7,114,050 B2
(45) Date of Patent: *Sep. 26, 2006

(54) METHOD AND SYSTEM FOR ACCESSING SPATIALLY ORGANIZED GEOGRAPHIC DATA IN BLOCKS

(75) Inventor: Richard A. Ashby, Blue River, WI (US)

(73) Assignee: Navteq North America, LLC, Chicago, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 10/967,468

(22) Filed: Oct. 18, 2004

(65) Prior Publication Data

US 2005/0085993 A1 Apr. 21, 2005

Related U.S. Application Data

(63) Continuation of application No. 09/576,779, filed on May 23, 2000, now Pat. No. 6,829,690.

(51) Int. Cl.
 *G06F 12/00* (2006.01)
(52) U.S. Cl. ............ 711/170; 707/100; 701/25
(58) Field of Classification Search ........... 711/170, 711/172; 707/102, 100, 101, 4; 701/25
See application file for complete search history.

(56) References Cited

U.S. PATENT DOCUMENTS

| | | | |
|---|---|---|---|
| 4,888,698 A | 12/1989 | Driessen et al. | 364/443 |
| 5,600,817 A | 2/1997 | Macom, Jr. et al. | 711/137 |
| 5,953,722 A | 9/1999 | Lampert et al. | 707/100 |
| 5,968,109 A | 10/1999 | Israni et al. | 701/208 |
| 5,974,419 A | 10/1999 | Ashby | 707/100 |
| 6,047,280 A | 4/2000 | Ashby et al. | 707/2 |
| 6,061,688 A * | 5/2000 | Kilpatrick et al. | 707/102 |
| 6,073,076 A | 6/2000 | Crowley et al. | 707/102 |
| 6,112,200 A * | 8/2000 | Livshutz et al. | 707/4 |
| 6,308,177 B1 * | 10/2001 | Israni et al. | 707/100 |

(Continued)

FOREIGN PATENT DOCUMENTS

EP 1111338 A2 * 6/2001

(Continued)

OTHER PUBLICATIONS

"Spatial Data Integrity Constraints In Object Oriented Geographic Data Modeling", Karla A. V. Borges et al, Proceedings of the 7th ACM international symposium on Advances in geographic information systems, Nov. 1999.*

(Continued)

*Primary Examiner*—Pierre-Michel Bataille
(74) *Attorney, Agent, or Firm*—Jon D. Shutter; Frank J. Kozak; Grace L. O'Brien

(57) ABSTRACT

A method whereby a computing platform that uses geographic data that are spatially organized into parcels of a given size can specify a parcel block size larger than the given size. Thereafter, during runtime, the geographic data are accessed by the computing platform in groups of one or more parcels not larger than the parcel block size. According to one embodiment, at or after initialization of the computing platform, groupings of parcels corresponding to parcel blocks are determined. Each parcel block has a size larger than the maximum parcel size but not larger than a maximum parcel block size. Data identifying the groupings and the parcels corresponding thereto are stored on the computing platform and the data identifying the groupings and the parcels corresponding thereto are used to access all the parcels corresponding to a parcel block whenever geographic data in any one of the parcels are needed.

20 Claims, 7 Drawing Sheets

U.S. PATENT DOCUMENTS

| | | | | |
|---|---|---|---|---|
| 6,460,046 | B1 | 10/2002 | Meek | 707/102 |
| 6,484,090 | B1 | 11/2002 | Lahaije et al. | 701/208 |
| 6,574,553 | B1 * | 6/2003 | Beesley et al. | 701/209 |
| 2001/0043745 | A1 * | 11/2001 | Friederich et al. | 382/232 |

FOREIGN PATENT DOCUMENTS

| | | | |
|---|---|---|---|
| EP | 1420563 A2 * | 5/2004 | |
| WO | WO 200233602 A2 * | 4/2002 | |

OTHER PUBLICATIONS

Multiple Representations In GIS: Materialization Through Map Generalization, Geometric, and Spatial Analysis Operations, Clodoveu A. Davis et al., Proceedings of the 7th ACM international symposium on Advances in geographic information systems, Nov. 1999.*

"What's Special About Spatial?: Database Requirements For Vehicle Navigation In Geographic space", Max J. Egenhofer, ACM SIGMOD Record, Proceedings of the 1993 ACM SIGMOD International Conference on Management of Data, Jun. 1993.*

"Matsuyama et al., A File Organization for Geographic Information Systems Based on Spatial Proximity" Computer Vision, Graphics and Image Processing 26:303-318 (1984).*

Ohnishi et al., "Map Database Generation System for In-Vehicle Navigation System", 1994 Vehicle Navigation & Information Systems Conference Proceedings. Published Aug. 31, 1994.*

Tsuzawa, M. et al., "Advanced Mobile Traffic Information and Communication System—AMTICS", IEEE—Vehicle Navigation and Information Systems Conference, Sep. 11-13, 1989, pp. 475-483.**

* cited by examiner

Figure 1: Parcel Boundaries when Maximum Parcel Size = 128K

Figure 2: Parcel Boundaries when Maximum Parcel Size = 64K

Figure 3: Parcel Boundaries when Maximum Parcel Size = 32K

Figure 4: Parcel blocks when Maximum Parcel Size = 32K and Parcel Buffer Size = 64K Figure 5: Parcel blocks when Maximum Parcel Size = 32K and Parcel Buffer Size = 128K

METHOD AND SYSTEM FOR ACCESSING SPATIALLY ORGANIZED GEOGRAPHIC DATA IN BLOCKS

The present application is a continuation of Ser. No. 09/576,779 filed May 23, 2000, now U.S. Pat. No. 6,829,690 the entire disclosure of which is incorporated herein by reference.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to geographic data used in navigation systems and more particularly the present invention relates to a way to use geographic data in a navigation system that provides improved performance.

Navigation systems (including navigation applications provided on other types of computing platforms such as general purpose computing platforms) use geographic data. Because navigation systems and navigation applications use geographic data in known ways, the geographic data can be organized and arranged so as to improve the performance of the navigation system or navigation application. Ways that geographic data can be organized and arranged to improve navigation system performance are described in U.S. Pat. Nos. 5,974,419, 5,968,109, and 5,953,722, the entire disclosures of which are incorporated by reference herein.

As described in the aforementioned patents, spatial data are divided into parcels. Each parcel contains data that represent geographic features (e.g., roads, intersections, points of interest, rivers, lakes, etc.) located within a geographic rectangular area. The amount of data in each parcel is constrained not to exceed a specified maximum parcel size. The process of dividing spatial data into parcels is referred to as "parcelization" and data that have been organized into parcels are referred to as being "parcelized." FIGS. 1–3 show the same geographic data parcelized using different maximum parcel sizes.

Spatially parcelized data are stored on various physical media, such as CD-ROM disks, DVD disks, hard drives, etc. Parcelized geographic data are accessed from such media and used by navigation systems and navigation applications.

Determining the best size to parcelize geographic data involves balancing several different factors. When a navigation system reads data from a medium into the memory of the navigation system (or other computing platform), there is overhead associated with each I/O operation. For example, it takes longer to read two 8K parcels separately from a CD-ROM disk than it does to read one 16K parcel. I/O performance is therefore degraded when average parcel size is too low.

On the other hand, during normal use of a navigation system, it is preferable to maintain several parcels of data in a buffer memory of the system at the same time. Some systems have limited memory resources. This imposes an upper limit on parcel size. If parcels are relatively large compared to the available buffer memory, relatively few parcels can be stored in the buffer memory at one time and therefore parcels may have to be discarded more frequently because the buffer space is needed for a different parcel. However, a discarded parcel may be needed a short time later and therefore the discarded parcel has to be re-read, thereby degrading performance.

Testing or analysis could suggest at what parcel size these two constraints are in balance and I/O performance is optimal. However, the best parcel size may vary from one hardware platform to another. A parcel size that is optimal for one platform could be sub-optimal for a different platform.

Accordingly, there is a need for a way to use geographic data in navigation systems to improve performance.

SUMMARY OF THE INVENTION

To address these and other objectives, the present invention comprises a method whereby a computing platform that uses geographic data that are spatially organized into parcels of a given size can specify a parcel block size larger than the given size. Thereafter, during runtime, the geographic data are accessed by the computing platform in groups of one or more parcels not larger than the parcel block size.

According to one embodiment, at or after initialization of the computing platform, groupings of parcels corresponding to parcel blocks are determined. Each parcel block has a size larger than the maximum parcel size but not larger than a maximum parcel block size. Data identifying the groupings and the parcels corresponding thereto are stored on the computing platform and the data identifying the groupings and the parcels corresponding thereto are used to access all the parcels corresponding to a parcel block whenever geographic data in any one of the parcels are needed.

DETAILED DESCRIPTION OF THE PRESENTLY PREFERRED EMBODIMENTS

1. Reading Parcels in Blocks

A method and system are described wherein geographic data can be stored in spatially organized parcels and further wherein the data can be accessed and used in a manner such that the amount of data read in one I/O operation can be tailored by platform to improve performance. According to the disclosed method and system, the storage arrangement of data on the medium, e.g., the CD-ROM disk, DVD disk, hard drive, etc., does not vary by platform. Instead, the same storage medium arrangement can be used in different hardware platforms. However, on each different platform, the data may be accessed differently to improve performance.

Figure 3:
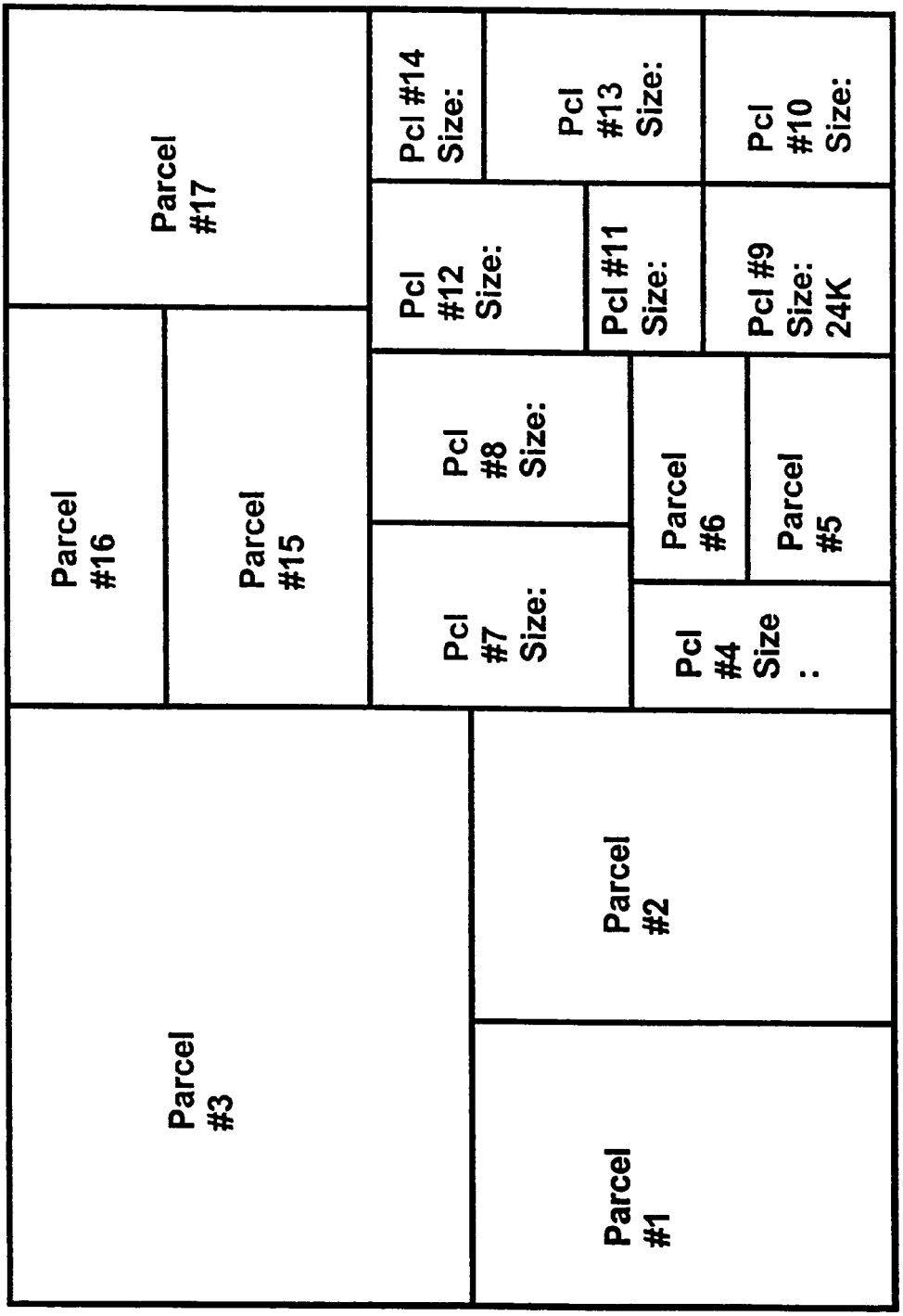
FIG. 3 shows the data as in FIGS. 1 and 2 but divided into 17 parcels not greater than 32K bytes in size.

The disclosed method is distinguished from the conventional ways of reading records in blocks that are used when data records are stored and processed sequentially. The method of blocking disclosed herein differs from simple record blocking because spatially organized data parcels are accessed spatially, i.e., parcels representing areas near each other spatially are likely to be needed close together in time. Blocks of consecutive parcel records on a medium, such as CD-ROM disk or a DVD disk, however, do not necessarily represent areas near each other spatially. In FIG. 3 for example, the block composed of parcels 13–16 represents two spatially separate areas, while the block composed of parcels 4–6 represents a single compact area.

EXAMPLE

Figure 1:
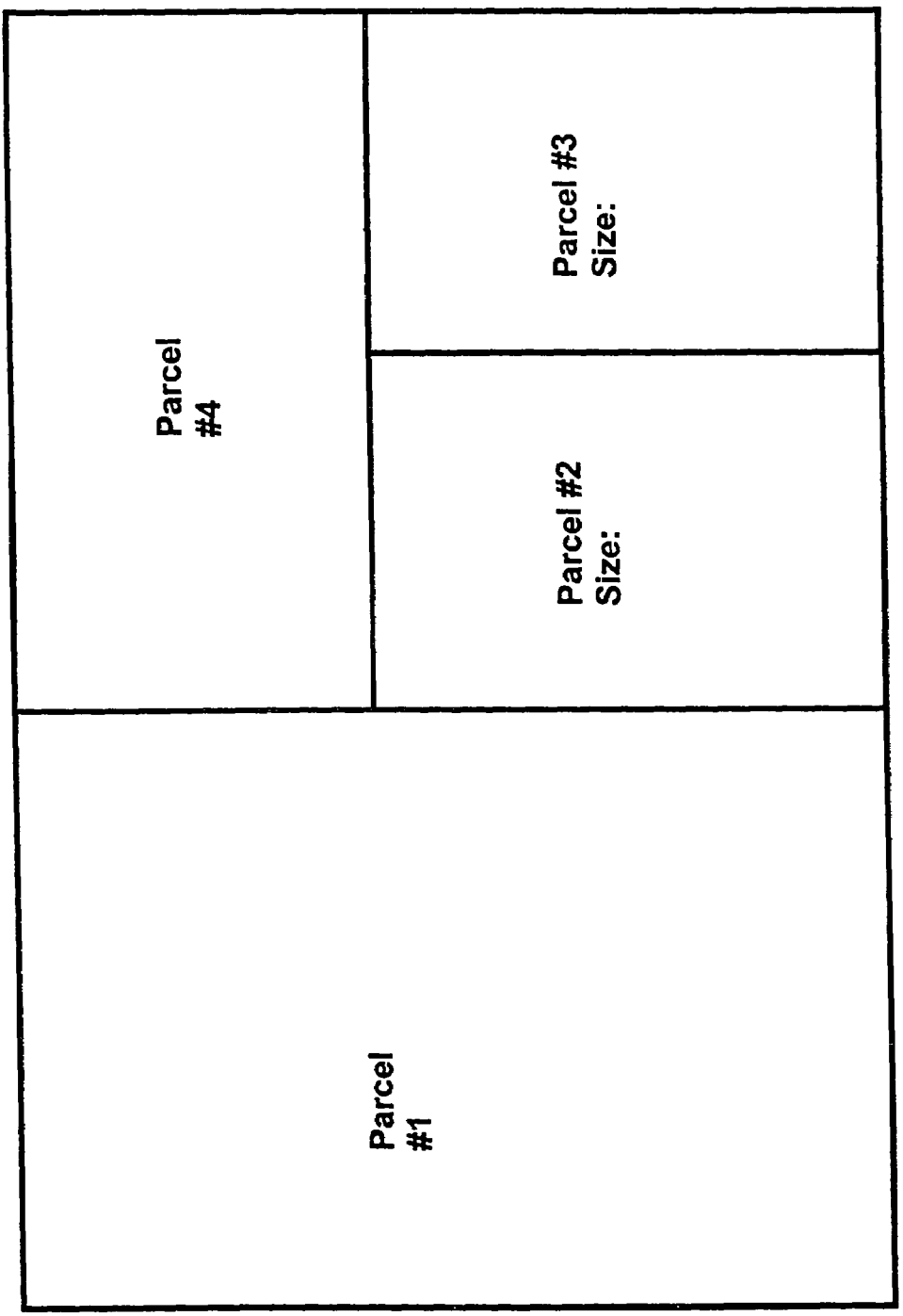
FIG. 1 shows spatial data divided into four parcels not greater than 128K bytes in size.
Figure 2:
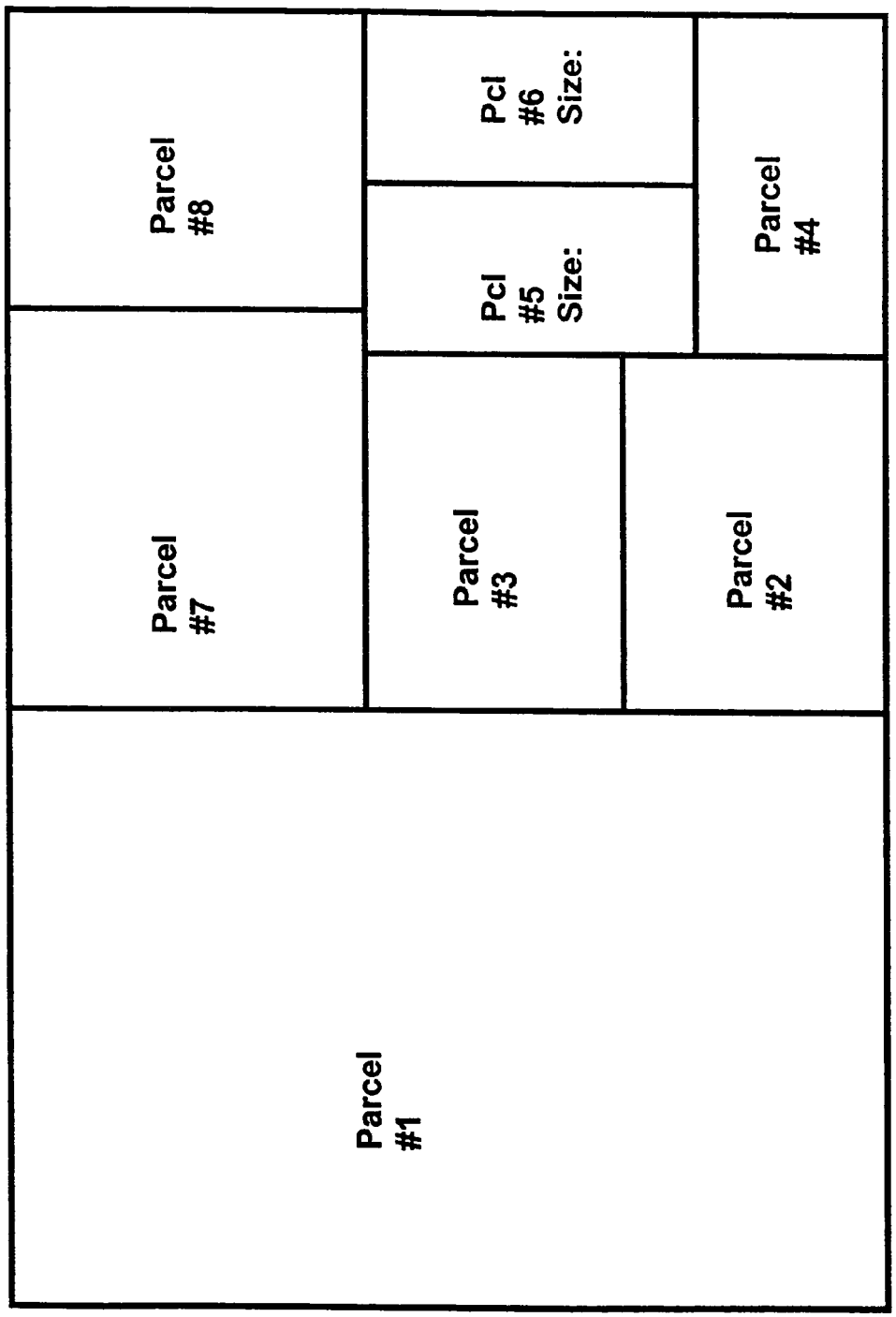
FIG. 2 shows the same data as in FIG. 1 but divided into eight parcels not greater than 64K bytes in size.

FIGS. 1–3 show a geographic area divided up in three different ways. FIG. 1 shows spatial data divided into four parcels not greater than 128K bytes in size. FIG. 2 shows the same data divided into eight parcels not greater than 64K bytes in size. FIG. 3 shows the same data divided into 17 parcels not greater than 32K bytes in size. Note that the total size of the data is larger in FIG. 3 than in FIG. 1. This is because there is overhead associated with each parcel (e.g., parcel headers and padding) and because there is often extra data generated at parcel boundaries.

Suppose that data organized according to FIGS. 1–3 are used on three different platforms. On platform A, it is optimal to read data in 128K blocks; on platform B it is optimal to read data in 64K blocks, and on platform C it is optimal to read data in 32K blocks. It is not possible to compile the data such that the parcel size is optimal on all three platforms. It is possible, however, to parcelize as in FIG. 3 (which is optimal for platform C) and to group the parcels at execution time into blocks—referred to herein as "parcel blocks"—that are optimally sized for platforms A and B.

Figure 4:
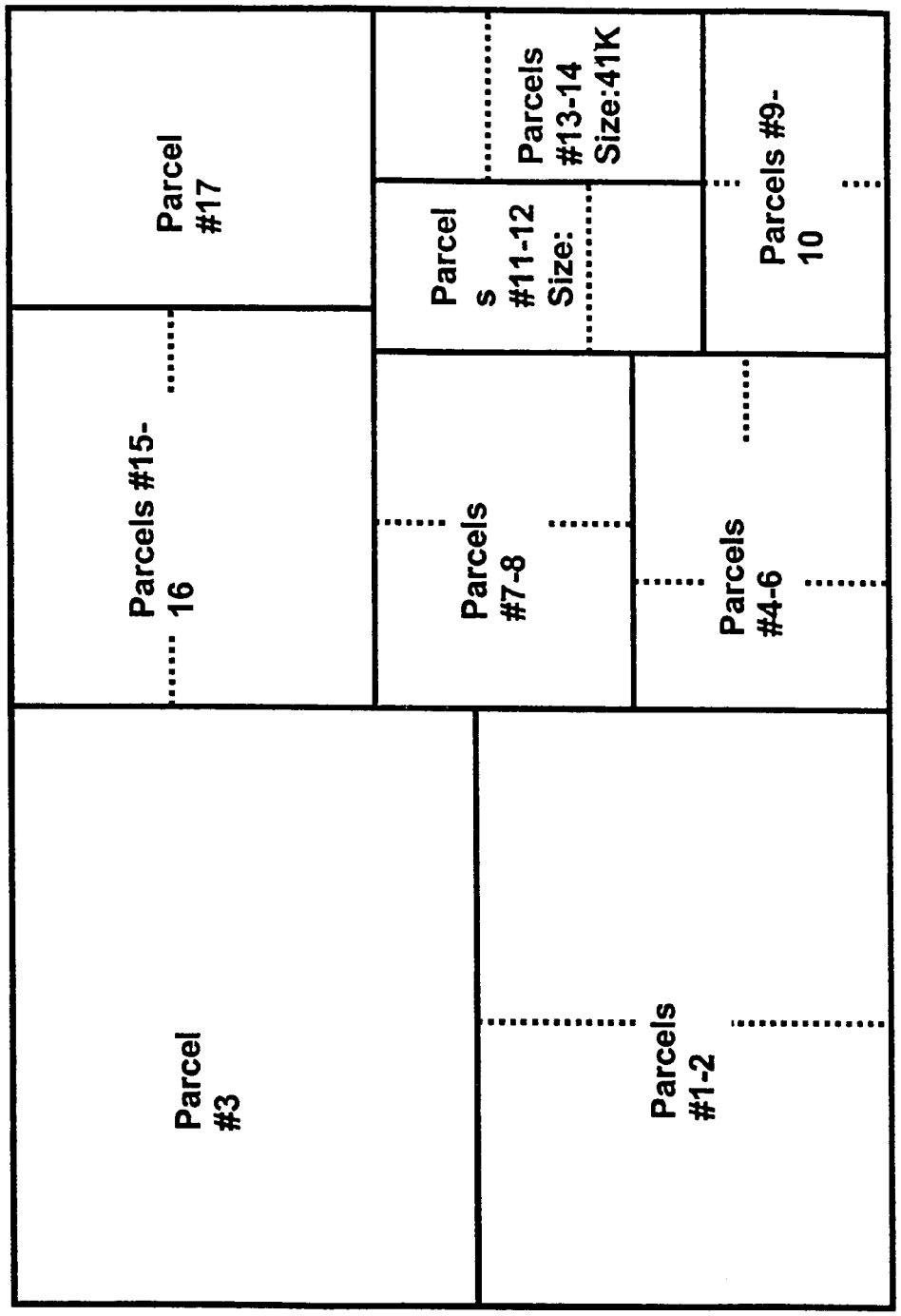
FIG. 4 shows the parcels from FIG. 3 grouped into nine parcel blocks not exceeding 64K bytes in size.

FIG. 4 shows the parcels from FIG. 3 grouped into nine parcel blocks not exceeding 64K bytes in size. A comparison of FIG. 4 and FIG. 2 reveals that the parcel blocks of 64K or less are different from the parcels that would be obtained if the data were parcelized with a 64K maximum parcel size. Even when a parcel block from FIG. 4 represents the same rectangle as a parcel in FIG. 2, the data sizes are slightly higher in FIG. 4 due to extra parcel overhead. Parcel blocking to obtain blocks of 64K, as in FIG. 4, results in an extra parcel block compared to the 64K parcels obtained with the parcelization method of FIG. 2. This occurs because parcels 1–3 add up to 66K bytes, too large to make a parcel block of 64K bytes or less. When the data were parcelized in FIG. 2 however, the parcel boundaries were determined in order to make the data for the same rectangle fit into 64K bytes.

Figure 5:
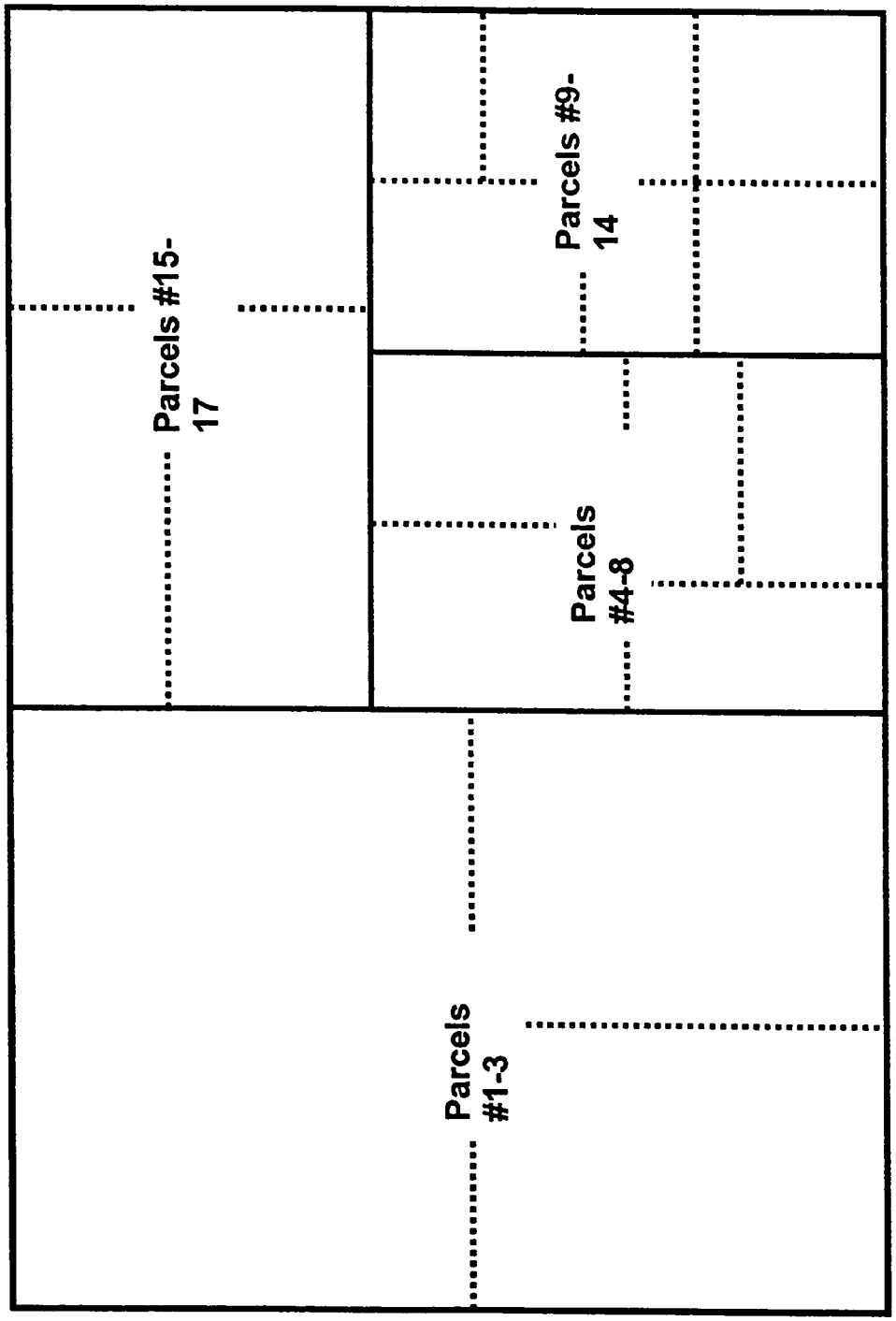
FIG. 5 shows the parcels from FIG. 3 grouped into four parcel blocks not exceeding 128K in size.

FIG. 5 shows the parcels from FIG. 3 grouped into four parcel blocks not exceeding 128K in size. The relationship of FIG. 5 to FIG. 1 is the same as the relationship of FIG. 4 to FIG. 2. In the case of FIG. 5, an extra parcel block does not result. There are four parcels in FIG. 1 and four parcel blocks in FIG. 5.

The application running on platform A can read the parcel blocks shown in FIG. 5 and get I/O performance comparable to what it would get reading parcels optimally sized for platform A (i.e., FIG. 1). The application running on platform B can read the parcel blocks shown in FIG. 4, and get I/O performance comparable to what it would get reading parcels optimally sized for platform B (i.e., FIG. 2).

2. Parcel Block Sizes are Arbitrary

Although the above example uses block sizes of 32K, 64K and 128K, this method does not constrain parcel block sizes to be either a power of 2 or an integer multiple of the maximum parcel size. Parcel block sizes should, however, be equal to or greater than the maximum parcel size.

3. Parcelization Constraints

It is preferable that the spatial parcel records be stored on the medium in an order that facilitates the grouping of parcels into parcel blocks. A preferred order is described in U.S. Pat. No. 5,953,722. (An exception, described below, relates to an embodiment in which parcels of different types of data are interleaved together.) A recursive parcelization algorithm that writes parcels in a preferred order is included in Appendix A of this specification. The algorithm is initially invoked with a rectangle containing the entire region to be parcelized. Using the method set forth in this algorithm, data parcels are written on a medium in an order that allows them to be grouped into parcel blocks.

4. Interleaving

Parcels of different data types may be interleaved together on the medium. Methods of interleaving are described in U.S. Pat. No. 6,038,559 and copending patent application Ser. No. 09/039,586, the entire disclosures of which are incorporated by reference herein.

Interleaving of different parcel types by a database compiler may be constrained when parcel blocking is to be used. When a parcel of data type B resides on the medium between two parcels of data type A, it may no longer be possible to form one parcel block containing the two type A parcels.

Following are three alternatives for handling interleaved data types:

1) Do not interleave any parcel type for which parcel blocking might be used.
2) Determine the largest parcel block size likely to be used on any platform, determine within the compiler the blocks of that size, and do not interleave other parcel types within any such blocks. This maximum block size would be stored in the database.
3) For the purposes of constructing parcel blocks, treat the two interleaved parcel types as if they were the same parcel type.

5. Defining Parcel Blocks

Appendix B includes pseudo-code for a function, BuildPclList(), that is used for the creation of a list of parcels that can be grouped into parcel blocks. This list is created when a navigation system is initialized rather than when the database is compiled, since different platforms are likely to have different optimal buffer sizes. The BuildPclList( ) function of Appendix B is called with two parameters: the root of the region's kd-tree and the optimal buffer size for the platform.

After the function BuildPclList( ) completes, the table of parcel ID's, called ParcelBlockArray, contains groups of parcels to be read in one I/O operation with the high order bit of the Parcel ID at the beginning of each group set to 1.

6. Building the Parcel Block List as a Background Task

A consideration related to the building of the list ParcelBlockArray at initialization is the amount of time that it takes to run. One way to address this consideration is to build the list of parcel blocks in the background. Then, the user would at first use the navigation unit without parcel blocks, reading spatial parcels one at a time as is done now. Once the parcel block list or lookup table is constructed, the navigation unit software can start reading parcels according to parcel blocks instead of one at a time.

7. Using the Parcel Block Array

The parcel block table generated above can be used in at least two ways:

Binary Search:

Given a parcel ID, determine the parcel block to which it belongs and read the group of parcels corresponding to the parcel block in one I/O operation as follows:

Binary search the Parcel Block Array for the given parcel ID (ignoring the high order bit in table entries). If the parcel ID is not found, the parcel is not part of a group (i.e., a parcel block). If the parcel ID is found, and the table entry's high order bit is not set to 1, back up until an entry whose high order bit is set to 1 is found. That parcel ID is the first parcel in the group. Go forward until another entry whose high order bit is set to 1 is found. The entry preceding this entry is the last parcel in the group.

Hash Table Lookup:

An alternative to accessing this data with a binary search is to use it to construct a hash table accessed by parcel ID. The hash table record returned would contain two items in addition to the parcel ID: (1) the parcel ID at the beginning of the parcel block and (2) the length of the block. If the hash table lookup failed to find a record, it would indicate the parcel was not part of a parcel block. Once the hash table is constructed, the parcel block table can be discarded.

8. Parcel Blocks and Buffer Management

After a parcel block is read into a memory buffer, buffer management is simplified if the parcel block is treated as a unit when buffers are re-used as illustrated by the following example.

Suppose a parcel block containing parcels 100–102 is read into memory. Later, some buffer space is needed for parcel 85. It is found that that parcel 102 is the least recently used parcel. Therefore, parcel 102 is discarded and parcel 85 is read into the memory space that parcel 102 has just vacated. Then, suppose that parcel 102 has to be read again. However, as noted above, parcel 102 is part of a parcel block containing parcels 100–102. The following alternatives exist for handling this occurrence.

1) The copies of parcels 100 and 101 currently in memory can be discarded and the whole parcel block (i.e., containing parcels 100–102) can be re-read.
2) The blocking can be ignored and just parcel 102 can be read.

Either alternative requires the navigation software compare the list of parcels in memory to the list of parcels in the parcel block and then make a decision about what to do. This complexity does not arise if parcels in a parcel block are discarded as a unit instead of piecemeal.

The point of using parcel blocks is to read spatial parcels in units optimally sized for the platform. If the compiler had initially generated parcels of that optimal size, then the navigation software would be discarding units of that size when re-using buffer memory. Treating the parcel block as a unit when managing buffers therefore approximates the behavior that would occur anyway if parcels were optimally sized for the platform.

9. Distribution of Geographic Data to Various Computing Platforms

Figure 6:
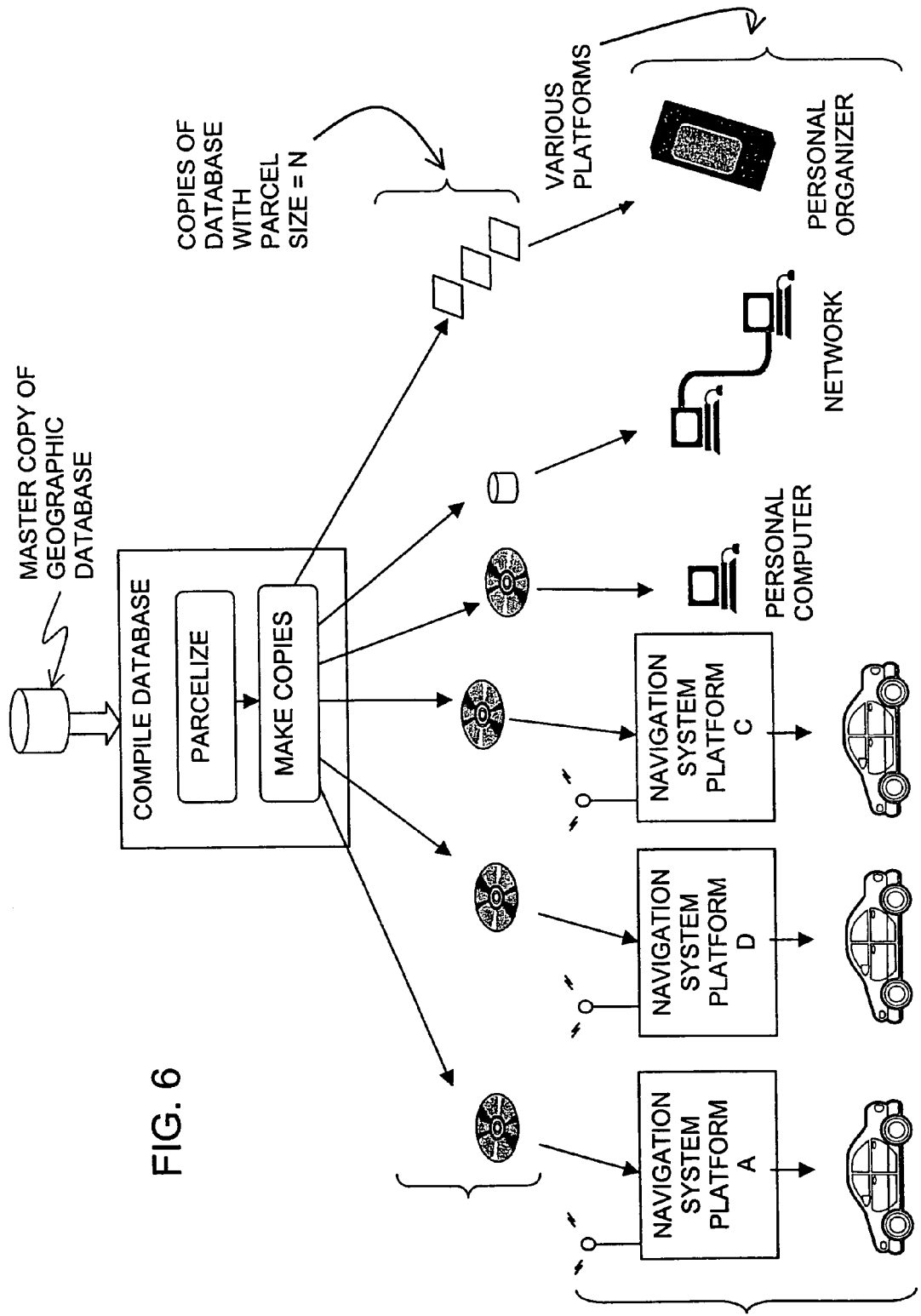
FIG. 6 is a diagram illustrating distribution of copies of a geographic database for use on various computing platforms each of which includes software that can select a different parcel block size for use therein.

FIG. 6 illustrates how a geographic database can be formed with parcels of a given size and then copies of the geographic database distributed to systems implemented on different platforms. A compiler generates parcels less than or equal in size to the smallest of the optimal parcel sizes for the different platforms. On each of the different platforms, data access software can select a parcel block size that is appropriate for the particular platform. The different platforms include different types of navigation systems, general purpose computing platforms, networks, wireless client-server applications, as well as other types of applications.

10. Data Access Interface Layer Software

Figure 7:
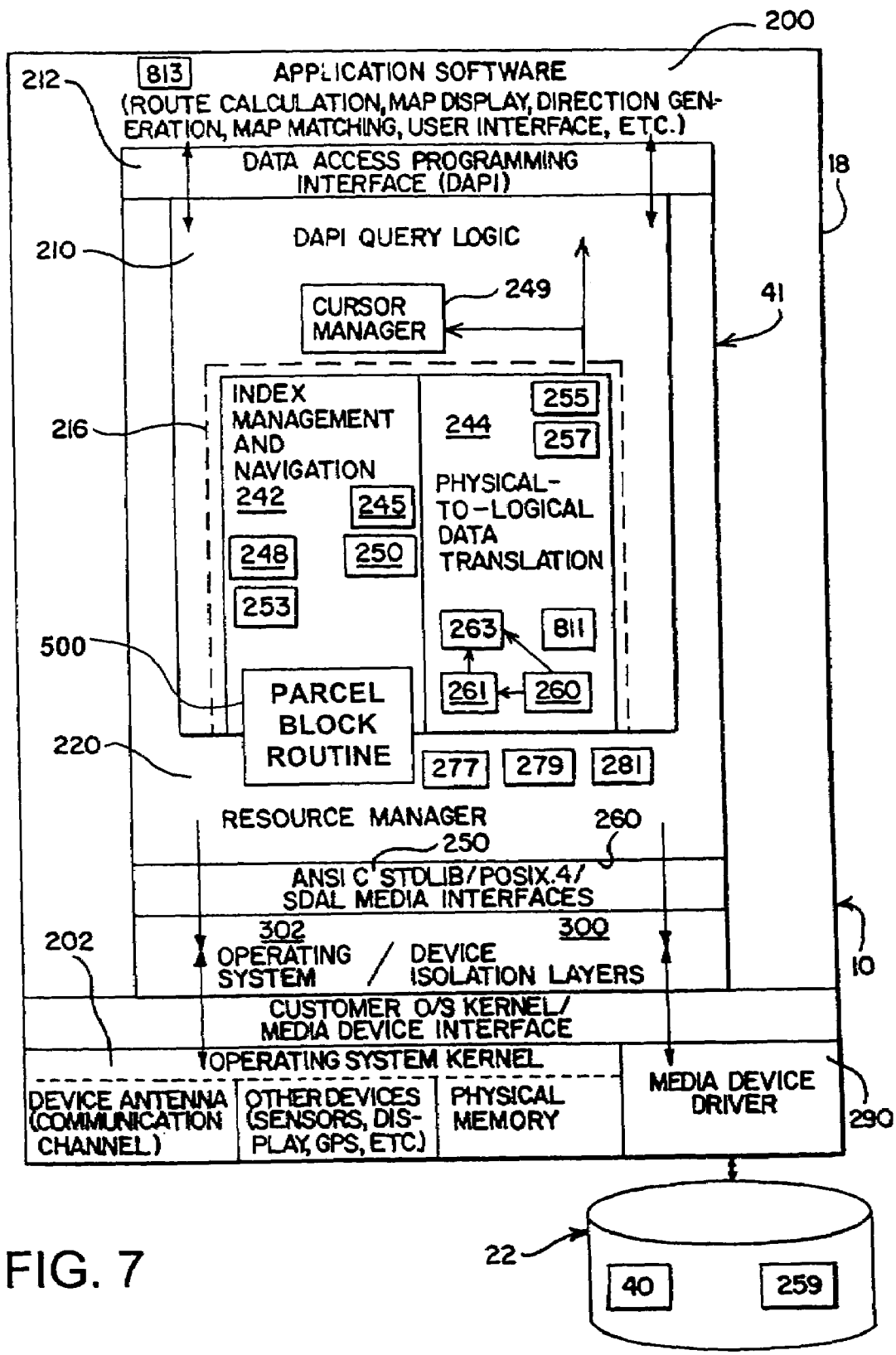
FIG. 7 is a block diagram of interface layer software that can be installed in the various computing platforms of FIG. 6 to select a parcel block size.

FIG. 7 is a block diagram that shows data access interface layer software 41 that can be included in each of the different platforms in FIG. 6 and used to access the geographic data provided thereto. The data access interface layer software 41 shown in FIG. 7 is similar or identical to the data access interface layer software described in U.S. Pat. No. 6,047,280, the entire disclosure of which is incorporated herein by reference. The components shown in FIG. 7 correspond to those described in the aforementioned patent.

The data access interface layer software 41 in FIG. 7 includes a routine 500 used to implement parcel blocking. The routine 500 is similar to the routine included in Appendix B. The routine 500 can be used to select a parcel block size suitable for the computing platform on which it is installed, build the parcel list array, and so on. The routine 500 resides between an index management layer 242 and a resource management layer 220. When the index management layer 242 determines a parcel to be read from the medium, the parcel blocking routine 500 intercepts the request for the parcel to be read, determines which parcel block the requested parcel belongs to, and then accesses all the parcels corresponding to the parcel block. All the parcels corresponding to the parcel block are then read by the resource management layer 220 into memory.

11. Alternatives

The method disclosed herein is not limited to any specific type of geographic database. The method can be used with databases formed according to different compiling methods.

The method may also be used when hardware resources in a computing platform are changed. For example, if an owner of an existing navigation system adds more memory, it may enhance performance of the navigation system to change the parcel block size to better utilize the greater memory resources.

It is intended that the foregoing detailed description be regarded as illustrative rather than limiting and that it is understood that the following claims including all equivalents are intended to define the scope of the invention.

APPENDIX A

© 2000 NAVIGATION TECHNOLOGIES CORPORATION, All rights reserved.
Function Parcelize( Bounding-Rectangle, Maximum-Parcel-Size )
   If the data in Bounding-Rectangle fits into one parcel record no
   larger than Maximum-Parcel-Size bytes:
      Generate the parcel and write the parcel record to disk.
   Otherwise:
      Divide Bounding-Rectangle into two sub-rectangles (Left-
      Subrectangle and Right-Subrectangle) with a horizontal or
      vertical line.
      Invoke function Parcelize( Left-Subrectangle, Maximum-Parcel-
      Size ).
      Invoke function Parcelize( Right-Subrectangle,
         Maximum-Parcel-Size ).
   Return to caller.

APPENDIX B

© 2000 NAVIGATION TECHNOLOGIES CORPORATION, All rights reserved.

```
Function BuildPclList( Kd-Tree-Root-Node, TargetSize )
    Data used in this process:
        Each entry of the following four arrays contains the subfields
        Type, Layer, PclID, and Size:
            InProcessArray[ ]
            TempArray[ ]
            TempLeftArray[ ]
            TempRightArray[ ]
        Each entry of the array TypeLayerArray[ ] contains the
        subfields Type and Layer. The array is initialized with one
        entry for each spatial parcel type and layer.
    Initialize the following: InProcessCount = 0, OutputCount = 0
    Call function ProcessKDNode (Kd-Tree-Root-Node, TargetSize )
    Set TempIndex = 0
    Do the following for each entry in TypeLayerArray (I is the array
    index) :
    {
        Set Size = 0
        for J = 0 through InProcessCount - 1, do the following:
        {
            if TypeLayerArray[I] .Type == InProcessArray[J] .Type and
            TypeLayerArray[I] .Layer == InProcessArray[J] .Layer
            {
                Set TempArray[TempIndex] = InProcessArray[J]
                Add InProcessArray[J] .Size to Size
                Increment TempIndex
                Add InProcessArray[J] .Size to Size
                Increment TempIndex
            }
        }
        if Size is not > TargetSize
        {
            if TempIndex > 1
            {
                Set ParcelBlockArray[OutputCount] =
                    TempArray[0] .PclID & 0x80000000
                Increment OutputCount
                for J = 1 through TempIndex - 1, do the following:
                {
                    Set ParcelBlockArray[OutputCount] =
                        TempArray[J] .pclID
                    Increment OutputCount
                }
            }
        }
    }
    Sort ParcelBlockArray in ascending order by the low-order 31 bits
    of each entry (i.e. ignore high order bits).
    ParcelBlockArray now contains parcel blocks, with the high order
    bit of the Parcel ID at the beginning of each block set to 1.
Function ProcessKDNode( Kd-Tree-Node, TargetSize )
    Set StartIndex = InProcessCount
    Set LeftIndex = InProcessCount
    Call ProcessKDNode (Kd-Tree-Node->Left-Child, TargetSize )
    For each Parcel ID in Kd-Tree-Node's left parcel descriptor
    list:
    {
        Set InProcessArray[InProcessCount] .Type = parcel type
            from parcel descriptor
        Set InProcessArray[InProcessCount] .Layer = parcel layer
            from parcel descriptor
        Set InProcessArray[InProcessCount] .PclID = parcel ID from
            parcel descriptor
        Set InProcessArray[InProcessCount] .Size = parcel size derived
            from parcel ID
        Increment InProcessCount
    }
    Set LeftCount = InProcessCount - LeftIndex
    Set RightIndex = InProcessCount
    Call ProcessKDNode (Kd-Tree-Node->Right-Child, TargetSize )
    For each Parcel ID in Kd-Tree-Node's right parcel descriptor list:
    {
        Set InProcessArray[InProcessCount] .Type = parcel type from
            parcel descriptor
        Set InProcessArray[InProcessCount] .Layer = parcel layer from
            parcel descriptor
        Set InProcessArray[InProcessCount] .PclID = parcel ID from
            parcel descriptor
        Set InProcessArray[InProcessCount] .Size = parcel size derived
            from parcel ID
        Increment InProcessCount
    }
    Set RightCount = InProcessCount - RightIndex
    Set WorkIndex = InProcessCount
    Set TempIndex = WorkIndex
    Do the following for each entry in TypeLayerArray (I is the array
    index) :
    {
        Set TempLeftIndex = 0
        Set LeftSize = 0
        Set TempRightIndex = 0
        Set RightSize = 0
        for J = LeftIndex through LeftIndex + LeftCount - 1, do the
        following:
        {
            if TypeLayerArray[I] .Type == InProcessArray[J] .Type
            and TypeLayerArray[I] .Layer == InProcessArray[J] .Layer
            {
                Set TempLeftArray[TempLeftIndex] =
                    InProcessArray[J]
                Add InProcessArray[J] .Size to LeftSize
                Increment TempLeftIndex
            }
        }
        for J = RightIndex through RightIndex + RightCount - 1, do the
        following:
        {
            if TypeLayerArray[I] .Type == InProcessArray[J] .Type and
            TypeLayerArray[I] .Layer == InProcessArray[J] .Layer
            {
                Set TempLeftArray[TempRightIndex] =
                    InProcessArray[J]
                Add InProcessArray[J] .Size to RightSize
                Increment TempRightIndex
            }
        }
        if LeftSize + RightSize is not > TargetSize
        {
            for J = 0 through TempLeftIndex - 1, do the following:
            {
                Set TempArray[TempIndex] = TempLeftArray[J]
                Increment TempIndex
            }
            for J = 0 through TempRightIndex - 1, do the following:
            {
                Set TempArray[TempIndex] = TempRightArray[J]
                Increment TempIndex
            }
        }
        else
        {
            if LeftSize is not > TargetSize
            {
                if TempLeftIndex > 1
                {
                    Set ParcelBlockArray[OutputCount] =
                        TempLeftArray[0] .PclID & 0x80000000
                    Increment OutputCount
                    for J = 1 through TempLeftIndex - 1, do the
                    following:
                    {
                        Set ParcelBlockArray[OutputCount] =
                            TempLeftArray[J] .pclID
                        Increment OutputCount
                    }
                }
            }
            if RightSize is not > TargetSize
            {
                if TempRightIndex > 1
                {
                    Set ParcelBlockArray[OutputCount] =
                        TempRightArray[0] .PclID & 0x80000000
                    Increment OutputCount
                    for J = 1 through TempRightIndex - 1, do the
                    following:
```

APPENDIX B-continued

```
        {
            Set ParcelBlockArray[OutputCount] =
                TempRightArray[J] .PclID
            Increment OutputCount
        }
      }
    }
  }
}
Set TempCount = TempIndex – WorkIndex
Set InProcessCount = StartIndex
for TempIndex = WorkIndex through WorkIndex + TempCount –
1, do the following:
{
    Set InProcessArray[InProcessCount] = TempArray[TempIndex]
    Increment InProcessCount
}
Return to caller.
```

I claim:

1. A method of providing geographic data comprising:
providing geographic data for use on a plurality of different computing platforms, wherein the geographic data are organized into parcels having a parcel data size;
selecting a parcel block data size for one of said platforms, wherein said parcel block data size is larger than said parcel data size; and
obtaining blocks of parcels together as groups, each of said blocks has a data size not exceeding said parcel block data size.

2. The method of claim 1 wherein said geographic data are spatially parcelized.

3. The method of claim 1 wherein said parcels include geographic data of different types interleaved together.

4. The method of claim 1 wherein said selecting step being performed by a software program associated with said one of said platforms.

5. The method of claim 1 wherein said step of obtaining is performed whenever geographic data in any parcel are accessed.

6. The method of claim 1 wherein said geographic data are provided to said plurality of different computing platforms on computer-readable media.

7. The method of claim 1 wherein said parcel block data size is an optimal data read size of said one of said different computing platforms.

8. A method of providing geographic data comprising:
providing geographic data for use in a plurality of different computing platforms, wherein the geographic data are organized into parcels wherein each of said parcels has a parcel size; and
assigning each of said parcels to a separate one of a plurality of parcel blocks; and whenever geographic data in any particular parcel are needed, obtaining all the parcels assigned to that parcel block to which said particular parcel was assigned.

9. The method of claim 8 wherein said parcel blocks are larger in size than said parcel size.

10. The method of claim 8 wherein said geographic data are provided to said plurality of different computing platforms on computer-readable media.

11. The method of claim 8 wherein said geographic data are stored in said plurality of different computing platforms on CD-ROM disks.

12. The method of claim 8 wherein said geographic data are spatially parcelized.

13. The method of claim 8 wherein said assigning step is performed by a software program.

14. The method of claim 8 wherein said parcels include geographic data of different types interleaved together.

15. A method of operating a computing platform that uses geographic data tat are spatially organized into parcels of data, each of which is an approximate parcel size, the method comprising:
executing a program that selects a parcel block size wherein said parcel block size is larger than said parcel size; and
obtaining together a plurality of parcels that conforms to said parcel block size whenever data in any one of said parcels are needed.

16. The method of claim 15 wherein said step of executing further comprises:
building an array that identifies groups of parcels that are to be accessed together as a group whenever any data in any one of said parcel in said group are needed.

17. The method of claim 16 wherein said step of building is executed at initialization.

18. The method of claim 16 wherein said step of building is executed as a background task.

19. The method of claim 16 further comprising:
obtaining parcels of data individually until said step of building is completed.

20. The method of claim 15 wherein said step of executing is performed at runtime.

* * * * *